US012394539B2

(12) United States Patent
Ivey et al.

(10) Patent No.: US 12,394,539 B2
(45) Date of Patent: Aug. 19, 2025

(54) CABLE PROTECTOR

(71) Applicant: DISH Wireless L.L.C., Englewood, CO (US)

(72) Inventors: Greg Ivey, Highlands Ranch, CO (US); Jerome A. LaPalme, Aurora, CO (US); Charles Iversen, Lakewood, CO (US); Steven Allen Nedved, Littleton, CO (US)

(73) Assignee: DISH Wireless L.L.C., Englewood, CO (US)

(*) Notice: Subject to any disclaimer, the term of this patent is extended or adjusted under 35 U.S.C. 154(b) by 355 days.

(21) Appl. No.: 18/108,601

(22) Filed: Feb. 11, 2023

(65) Prior Publication Data

US 2024/0274321 A1 Aug. 15, 2024

(51) Int. Cl.
*H01B 7/282* (2006.01)

(52) U.S. Cl.
CPC .................................... *H01B 7/282* (2013.01)

(58) Field of Classification Search
CPC ....... H01B 7/282; H02G 15/013; H02G 15/10
USPC ........................................................ 174/70 R
See application file for complete search history.

(56) References Cited

FOREIGN PATENT DOCUMENTS

JP H01170309 A * 7/1989 ........... H02G 15/013

* cited by examiner

*Primary Examiner* — Timothy J Thompson
*Assistant Examiner* — Guillermo J Egoavil
(74) *Attorney, Agent, or Firm* — Wash Park IP Ltd.; John T Kennedy

(57) ABSTRACT

An assembly, devices and processes for protecting electrical equipment may include a first sleeve hemisphere, a first sleeve proximal gasket positioned within the first sleeve hemisphere, a second sleeve hemisphere which mates with the first sleeve hemisphere to form a full sleeve and a second sleeve proximal gasket positioned within the second sleeve hemisphere. A cable protector may be formed by the mating of the first sleeve hemisphere with the second sleeve hemisphere and around at least a cable center section of a cable. The cable center section may be coupled to a cable proximal portion which is further coupled to a cable external proximal portion. When the cable protector is formed, the first sleeve proximal gasket combined with the second sleeve proximal gasket contact and surround the cable proximal portion and inhibit a proximal water inflow from the cable external proximal portion into the cable center section.

19 Claims, 7 Drawing Sheets

CABLE PROTECTOR

TECHNICAL FIELD

The technology described herein relates to protecting components inside equipment cabinets from moisture penetrations.

BACKGROUND

Electrical and electronic communications components for wireless and wired telecommunications facilities are commonly provided in an unprotected configuration in a ground level equipment cabinet (GLEC) or similar structure, or in a protected configuration in the form of an Outdoor Rated Component (ORC). An ORC may be mounted, placed, or otherwise disposed on telecommunications towers and otherwise. ORCs are commonly rated by the National Electrical Manufacturers Association (NEMA), at a NEMA 3 or higher rating. A NEMA 3 rating ensures a given component is protected against windblown dust, rain, sleet, and external ice formation. Contrarily, unprotected components are commonly not outdoor rated and may have NEMA rating lower than NEMA 3, if having any NEMA rating. While a GLEC may have features that provide some protection against water and/or other fluid penetrations therein, penetrations by water and/or other fluids (such fluids being individually and/or collectively referred to herein as "water") may occur via a cable. For example, water may proceed on and/or within a cable from an environment exterior to the GLEC into an environment within the GLEC, where one or more unprotected components are located.

As used herein, a "cable" refers to any form of cable including single cables, bundle of cables, hybrid and/or multipurpose cables, or otherwise. A cable may be configured of any material with non-limiting examples including aluminum, copper, steel, optical fibers, and the like. A cable may be used for any given purpose, such as conveying data, providing a ground source, providing electrical power, providing structural support, and/or otherwise.

Water penetration into an unprotected component may degrade, damage, and/or destroy the component, cause fires within a GLEC, and/or result in other undesirable conditions or potential conditions (e.g., electrical shocks, electrical shorts, slip and fall risks, and the like). Accordingly, devices and systems are needed for preventing water penetrations, via cabling, into GLECs.

The information included in this Background section of the specification, including any references cited herein and any description or discussion thereof, is included for technical reference purposes only and is not to be regarded subject matter by which the scope of the present disclosure or any claim arising therefrom is to be bound.

SUMMARY

For at least one implementation of the present disclosure, an assembly may include a first sleeve hemisphere; a first sleeve proximal gasket positioned within the first sleeve hemisphere; a second sleeve hemisphere which mates with the first sleeve hemisphere to form a full sleeve; and a second sleeve proximal gasket positioned within the second sleeve hemisphere. A cable protector may be formed by the mating of the first sleeve hemisphere with the second sleeve hemisphere and around at least a cable center section of a cable. The cable center section may be coupled to a cable proximal portion which may be further coupled to a cable external proximal portion. When the cable protector is formed, the first sleeve proximal gasket combines with the second sleeve proximal gasket contact to surround the cable proximal portion and inhibit a proximal water inflow from the cable external proximal portion into the cable center section.

For at least one implementation and when a cable protector is formed, the first sleeve proximal gasket combined with the second sleeve proximal gasket may inhibit a proximal water outflow from the cable center section onto the cable external proximal portion.

For at least one implementation, a first sleeve hemisphere may include at least one drain hole. When the cable protector is formed, the at least one drain hole facilitates water outflow from the cable center section to an external environment. Gravitational forces may further facilitate the water outflow from the cable center section to the external environment via the at least one drain hole.

For at least one implementation, the first sleeve hemisphere and the second sleeve hemisphere may have identical configurations. When the cable protector is formed about a cable, the cable protector may be oriented within an X-Y-Z coordinate system, where an X-axis of the X-Y-Z coordinate system corresponds to a center line of the cable protector, a Y-axis may be a pitch axis, and the second sleeve hemisphere may be rotated one-hundred and eighty degrees (180°) about the pitch axis to mate with the first sleeve and form the cable protector.

For at least one implementation, a cable has a cable diameter and a length that extends throughout and beyond a length of the cable protector. An assembly further may include a first sleeve proximal collar; and a second sleeve proximal collar. The first sleeve proximal collar and the second sleeve proximal collar may adapt the cable protector, when formed, for use with a second cable having a second cable diameter and without changing dimensions for at least one combination of: the first sleeve hemisphere with the second sleeve hemisphere; and the first sleeve proximal gasket with the second sleeve proximal gasket.

For at least one implementation, a proximal clamp may surround a proximal portion of the full sleeve. Upon tightening of the proximal clamp, a first pressure (P1) may be uniformly applied, by the proximal clamp, onto the cable proximal portion via a first combination of the first sleeve, the first sleeve proximal collar and the first sleeve proximal gasket, and a second combination of the second sleeve, the second sleeve proximal collar, and the second sleeve proximal gasket. The first pressure P1, as so applied, may further inhibit the proximal water inflow from a cable exterior proximal portion into the cable center section.

A cable center section may be further coupled to a cable distal portion. The cable distal portion may be further coupled to a cable external distal portion. For at least one implementation, the assembly further may include: a first sleeve distal gasket positioned within the first sleeve hemisphere; and a second sleeve distal gasket positioned within the second sleeve hemisphere. When the cable protector is formed, the first sleeve distal gasket combined with the second sleeve distal gasket contact surround the cable distal portion and inhibit a distal water inflow from the cable external distal portion into the cable center section.

For at least one implementation, a first sleeve distal collar and a second sleeve distal collar may adapt the cable protector for use with a second cable having a second cable diameter and without changing dimensions for at least one combination of: a first sleeve hemisphere with a second sleeve hemisphere; and a first sleeve distal gasket with a second sleeve distal gasket. A distal clamp may surround a distal portion of the full sleeve. Upon tightening of the distal clamp, a second pressure (P2) may be applied by the distal clamp, through the full sleeve and further through the first sleeve distal gasket and the second sleeve distal gasket and onto the cable at a cable exterior distal portion. The second pressure (P2), when so applied, may further inhibit water flow from with the center segment of the full sleeve onto the cable exterior distal portion.

For at least one implementation, a first sleeve hemisphere further may include, in a linear sequence: a first sleeve distal end segment, a first sleeve center segment, and a first sleeve proximal end segment. The first sleeve distal end segment may include an first sleeve distal end segment outer collar and a first sleeve distal end segment inner collar. The first sleeve proximal end segment may include a first sleeve proximal end segment outer collar and a first sleeve proximal end segment inner collar. A first sleeve proximal gasket may be further positioned within a first cavity in the first sleeve proximal end segment formed between the first sleeve proximal end segment outer collar and the first sleeve proximal end segment inner collar. A first sleeve distal gasket may be further positioned within the first sleeve distal end segment in a second cavity formed between the first sleeve distal end segment outer collar and the first sleeve distal end segment inner collar. The first cavity may form a proximal hemisphere having a fourth diameter. The second cavity may form a distal hemisphere having the fourth diameter. The cable center section may be further coupled to a cable distal portion which is further coupled to a cable external distal portion.

For at least one implementation, the assembly further may include a first sleeve distal gasket positioned within the first sleeve hemisphere and a second sleeve distal gasket positioned within the second sleeve hemisphere. When the cable protector is formed, the first sleeve distal gasket combined with the second sleeve distal gasket may contact and surround the cable distal portion and inhibit a distal water inflow from the cable external distal portion into the cable center section.

For at least one implementation, a first sleeve hemisphere may include a plurality of first pins spaced along an upper portion of the first sleeve hemisphere and a plurality of first holes spaced along a lower portion of the first sleeve hemisphere. The second sleeve hemisphere may be provided in a mirrored configuration of the first sleeve hemisphere and further may include a plurality of second pins spaced along a lower portion of the second sleeve hemisphere and a plurality of second holes spaced along an upper portion of the first sleeve hemisphere. Mating of the first sleeve hemisphere with the second sleeve hemisphere may include insertion of the plurality of first pins into the plurality of second holes and insertion of the plurality of second pins into the plurality of first holes.

For at least one implementation, a first sleeve hemisphere may include a plurality of first channels spaced along an upper portion of the first sleeve hemisphere and a plurality of first ridges spaced along a lower portion of the first sleeve hemisphere. The second sleeve hemisphere may be a mirrored configuration of the first sleeve hemisphere and may include a plurality of second channels spaced along a lower portion of the second sleeve hemisphere and a plurality of second ridges spaced along an upper portion of the first sleeve hemisphere. Mating of the first sleeve hemisphere with the second sleeve hemisphere may include the insertion of the plurality of first ridges into the plurality of second channels and the insertion of the plurality of second ridges into the plurality of first channels. Implementations of the described techniques may include hardware, a method or process.

For at least one implementation of the present disclosure, a process for protecting a ground level equipment cabinet from water intrusion via a cable coupled thereto may include selecting a cable coupled to a ground level equipment cabinet (GLEC), identifying a cable center section, of the cable, at which to remove an outer layer of the cable, removing the outer layer of the cable along the cable center section, and determining a cable diameter for the cable. The process may further include, for each of a first sleeve hemisphere and a second sleeve hemisphere, operations including: first selecting, a proximal collar; second selecting a proximal collar based on the proximal collar and the cable diameter; first inserting the proximal gasket into the proximal collar; first determining if the proximal gasket and the proximal collar are compatible with the cable; when compatible, first securing the proximal gasket into the proximal collar to form a first combined proximal gasket and proximal collar combination; if not compatible, third selecting at least one of a second proximal gasket and a second proximal collar until a second proximal gasket and proximal collar combination are compatible with the cable. The process also may include second securing one of the first proximal gasket and proximal collar combination and the second proximal gasket and proximal collar combination into the first sleeve hemisphere; repeating the operations above for the second sleeve hemisphere, repeating the operations above for a second distal gasket and a second distal collar combination. The process may also include positioning the first sleeve hemisphere on the cable; mating the second sleeve hemisphere to the first sleeve hemisphere to form a full sleeve; positioning and tightening a proximal clamp around a proximal end of the full sleeve; and positioning and tightening a distal clamp around a proximal end of the full sleeve, where upon the tightening of the proximal clamp and the distal clamp inflows of water into the cable are inhibited and outflows of water from the cable are facilitated and thereby provide a substantially three-hundred and sixty degree (360°) water protected cable. The process may also include coupling the 360° water protected cable to the GLEC.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of implementations of the present disclosure as defined in the claims is provided in the following written description of various embodiments and implementations and illustrated in the accompanying drawings.

BRIEF DESCRIPTION OF THE DRAWINGS

The disclosure will be readily understood by the following detailed description in conjunction with the accompanying drawings, wherein like reference numerals designate like structural elements. It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated implementation of the present disclosure to the exclusion of other implementations described with reference thereto.

The features, aspects, advantages, functions, modules, and components of the devices, systems and processes provided by the various implementations of the present disclosure are further disclosed herein regarding at least one of the following descriptions and accompanying drawing figures. In the appended figures, similar components or elements of the same type may have the same reference number and may include an additional alphabetic designator, such as 108*a*-108*n*, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference number irrespective of any additional alphabetic designators or second reference labels, if any.

DETAILED DESCRIPTION

Base stations at wireless towers for transceiver antenna cells house or support multiple pieces of equipment needed to support the transceiver antennas. Such equipment may include radio transceivers, switches, network connection cabinets, control systems, power protection cabinets (PPC) for electrical hookup, on-site generators (e.g., to meet backup power requirements). Often this equipment is housed within a GLEC near or adjacent to an antenna tower. In other installations, for example, when the antennas are mounted on the roof or exterior wall of a building, the related support equipment may be housed in unused mechanical areas of the building, for example, in a basement, or within a mechanical space dedicated to a floor; components situated within such a building interior area are also referred to herein, for purposes of conciseness, as arising within a GLEC.

In accordance with at least one implementation of the present disclosure, a three-hundred and sixty degree (360°) cable protector is utilized to isolate unprotected components from water penetrations that might otherwise occur, absent use of an implementation of the present disclosure, via fluids conducted on and/or within a cable.

As shown in FIGS. 1-4 and in accordance with at least one implementation of the present disclosure, a cable protector 100 having an overall length (L1) may include a first sleeve hemisphere 101(1) that includes a first sleeve proximal end segment 102(1P), a first sleeve distal end segment 102(1D), and a first sleeve center segment 104(1). Components inserted into the first sleeve hemisphere 101(1) may include a first sleeve proximal gasket 108(1P); a first sleeve distal gasket 108(1D); a first sleeve proximal collar 110(1P); and a first sleeve distal collar 110(1D).

The cable protector 100 may further include a second sleeve hemisphere 101(2) that includes a second sleeve proximal end segment 102(2P), a second sleeve distal end segment 102(2D), and a second sleeve center segment 104(2). Components inserted into the second sleeve hemisphere 101(2) may include a second sleeve proximal gasket 108(2P); a second sleeve distal gasket 108(2D); a second sleeve proximal collar 110(2P); and a second sleeve distal collar 110(2D). The gaskets 108 may be inserted into the collars 110 and/or inserted directly into the sleeve hemispheres 101.

The cable protector 100 may further include a proximal clamp 106(P) and a distal clamp 106(D).

Sleeve Hemisphere 101

Figure 2A:
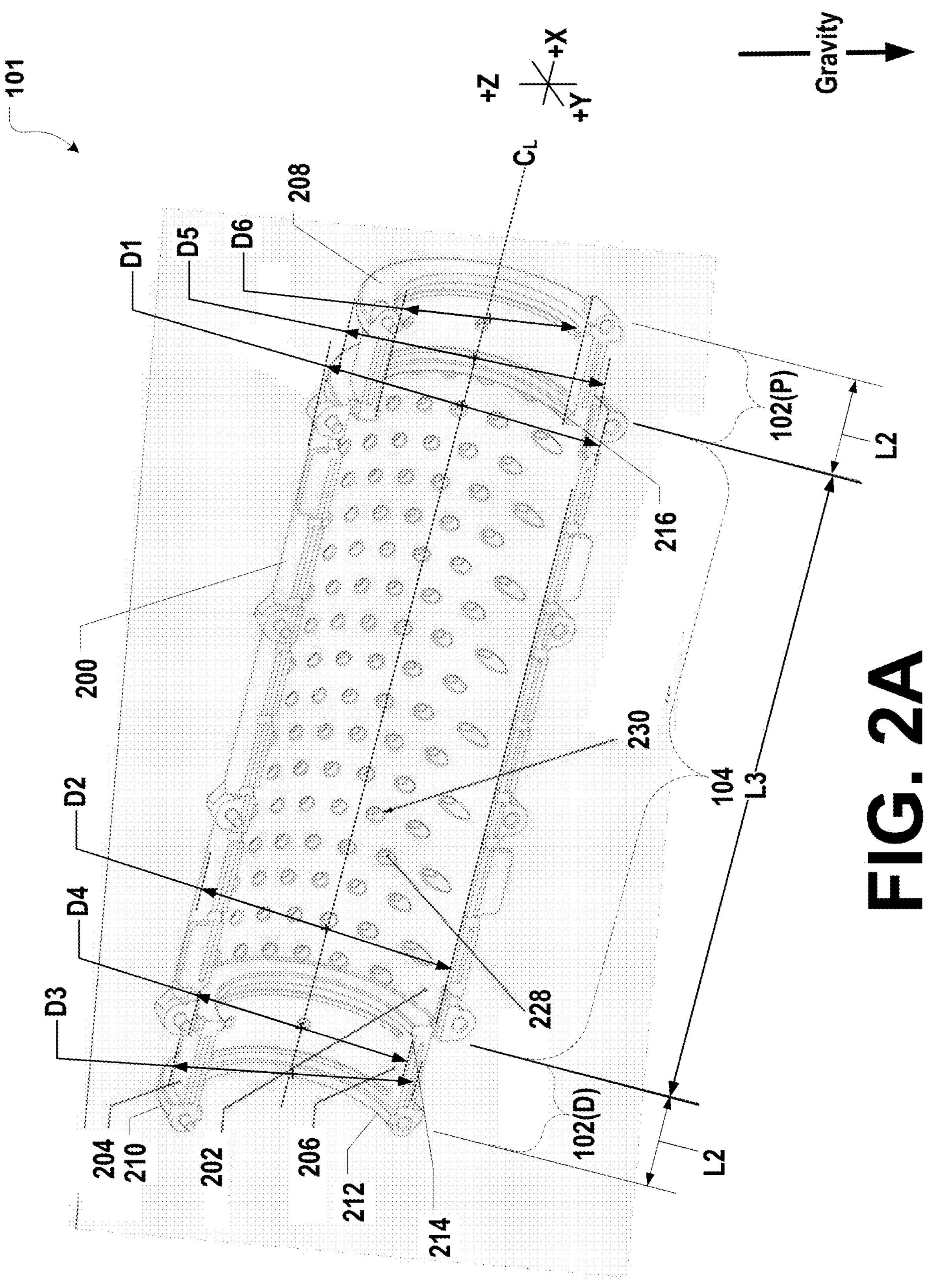
FIGS. 2A and 2B are sectional views of a sleeve hemisphere, taken along the line 2-2 of the cable protector of FIG. 1, and in accordance with at least one implementation of the present disclosure.
Figure 2B:
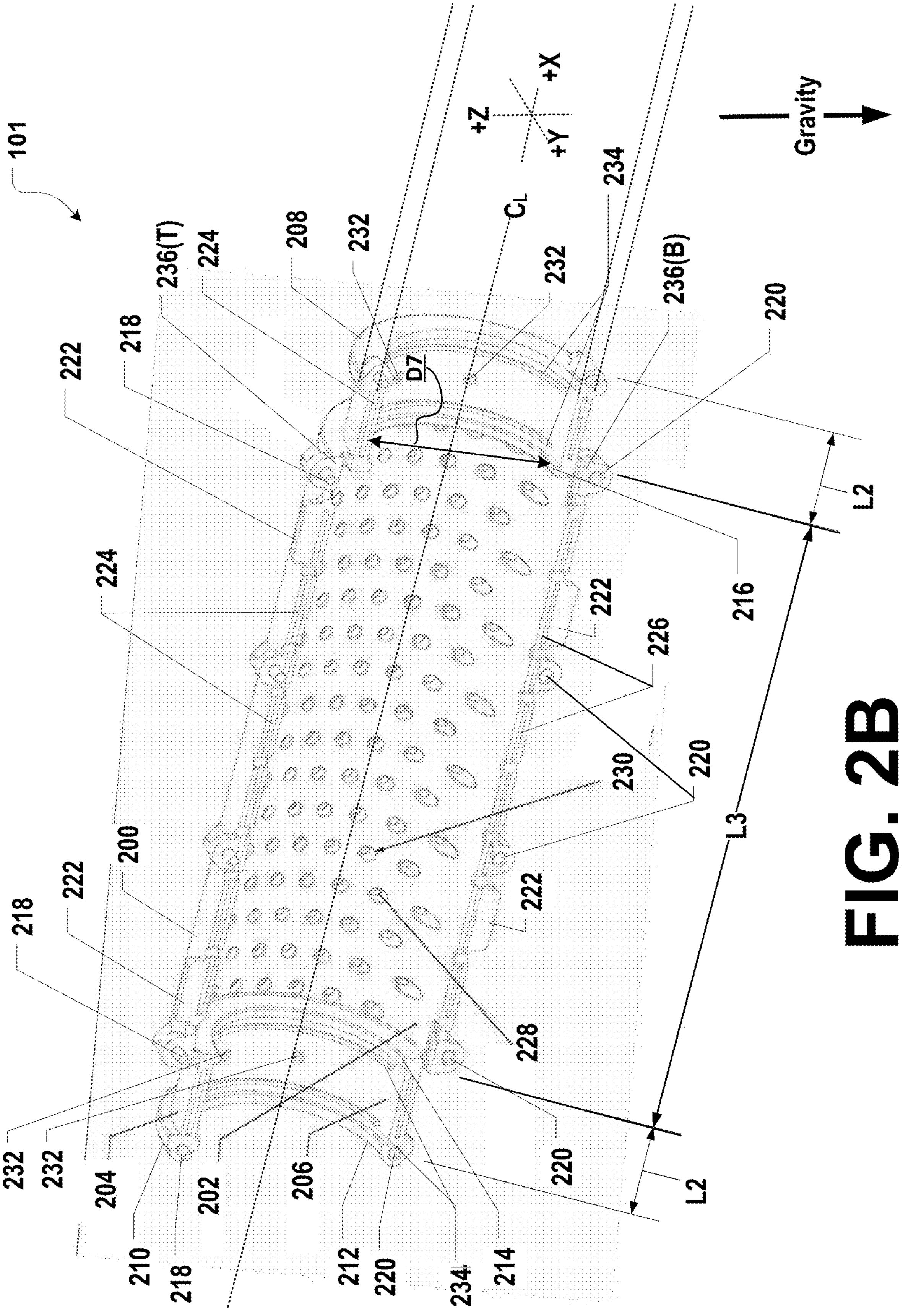

As shown in FIGS. 2A and 2B and for at least first implementation (herein, a "mirrored implementation") the first sleeve hemisphere 101(1) may be a mirror image of the second sleeve hemisphere 101(2). When assembled into a cable protector 100, the second sleeve hemisphere 101(2) may be rotated one-hundred and eighty degrees (180°) about a "pitch axis" which is shown as the Y axis of an illustrative X-Y-Z coordinate system, wherein the X axis corresponds to "roll axis" aligned with a center line CL and the Z axis corresponds to "yaw axis" of the cable protector 100. The X-Y-Z coordinate system may be rotated so as to be relative to a given orientation of the cable protector 100 in a given three dimensional space. The first sleeve hemisphere 101(1) and second sleeve hemisphere 101(2) may be configured to mate with each other to form a full sleeve by mating the first sleeve hemisphere 101(1) with the second sleeve hemisphere 101(2). The full sleeve, 101(1) mated with 101(2), about a cable 302 inhibits movement of water along and out of a cable 302 regardless of a then arising orientation (or rotation) of the respective sleeve hemispheres 101 relative to a given axis of the cable 302.

For at least one, non-shown, second implementation (herein, a "non-mirrored implementation"), a first sleeve hemisphere 101(1) may have a different configuration than a second sleeve hemisphere 101(2). The first sleeve hemisphere 101(1) may be configured for mating with the second sleeve hemisphere 101(2) and to facilitate the expulsion of water from a cable when a cable protector 100 formed by the mating of the first sleeve hemisphere 101(1) with the second sleeve hemisphere 101(2) about the cable is within a given angle of rotation of the cable protector 100 about the X-axis. More specifically, for the non-mirrored implementation, a given sleeve hemisphere may be further configured to control the expulsion of water from a cable in one or more directions and/or under one more conditions, while not expelling water from the cable in one or more second directions and/or under one or more second conditions. For a non-limiting example of a non-mirrored implementation, a given cable protector 100 may be configured to expel water from a cable in one or more combinations of the +Y and −Z directions and away from a GLEC while not expelling water in one or more combinations of the −Y and −Z directions (which may be towards a GLEC).

Sleeve Center Segment 104

For both the mirrored implementation and the non-mirrored implementation, the first sleeve hemisphere 101(1) includes a first sleeve center segment 104(1) and the second sleeve hemisphere 101(2) includes second sleeve center segment 104(2). The sleeve center segments 104 may have a sleeve center segment length (L3), as shown in FIGS. 2A and 2B. For at least one implementation, L3=0.625 inches. Other lengths may be used for other implementations.

Figure 1:
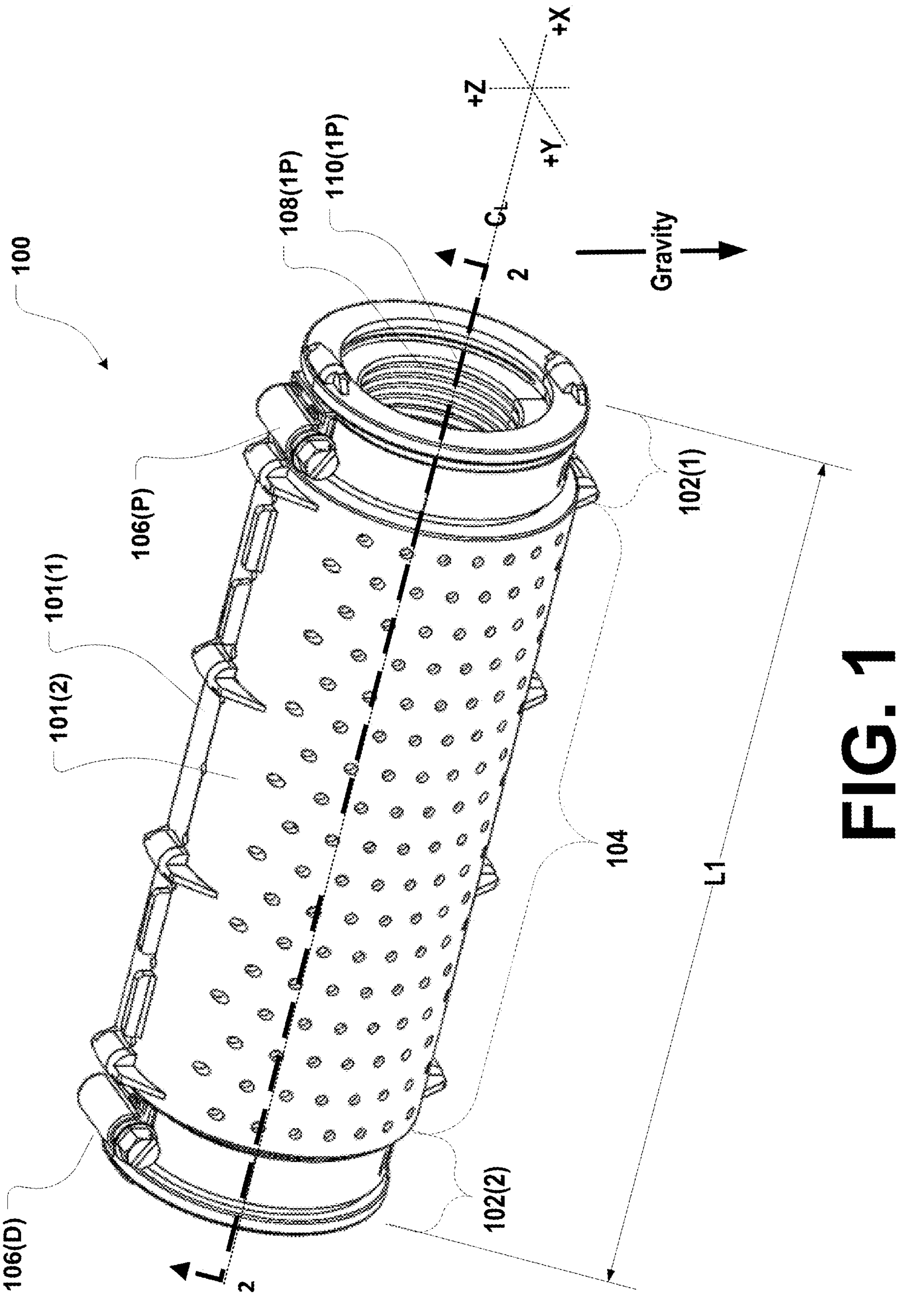
FIG. 1 is a perspective view of a cable protector and in accordance with at least one implementation of the present disclosure.
Figure 5:
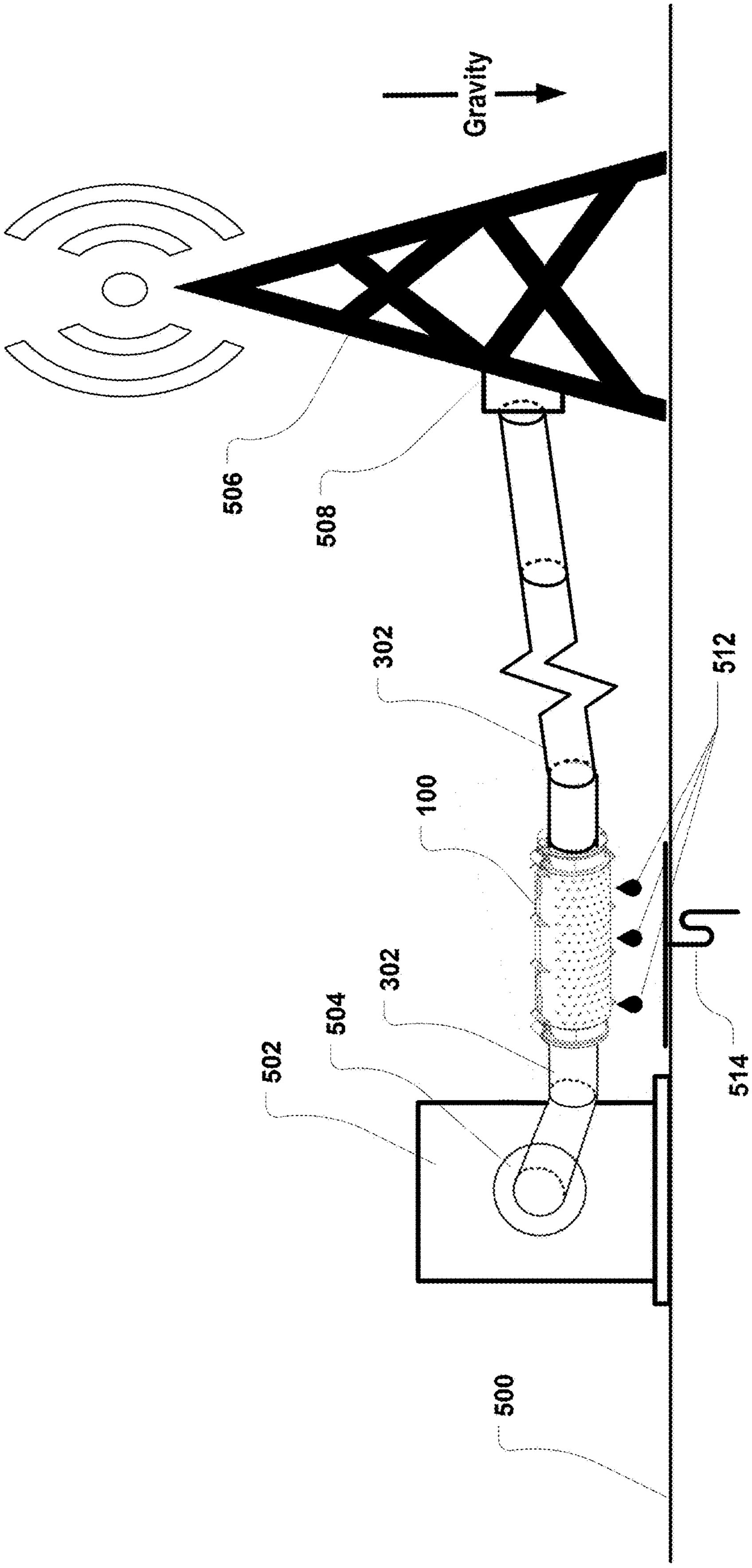
FIG. 5 is a schematic view of an implementation of the cable protector of FIG. 1 as utilized to protect one or more unprotected components provided in GLEC from moisture penetrations by a cable coupled to one more ORCs, such as those provided on or with a telecommunications tower or the like, and in accordance with at least one implementation of the present disclosure.

For at least one implementation, the sleeve center segment 104 may be configured to expel water from a cable in one or more of an upwards (+Z), downwards (−Z), frontwards (+Y), backwards (−Z), and along a left-right (−X to +X) length of the sleeve center segment length L3. As used herein, gravitational, centrifugal, surface tension, and/or other forces may be used to expel water from a cable in a given direction as provided for by a given implementation. For cables connecting to components in a GLEC (as shown in FIG. 5) and where a cable protector 100 is aligned as shown in FIG. 1, gravitational forces may align with the −Z direction. For other orientations of the cable protector 100, gravitational forces are herein defined to arise in a "downward" direction which may align with any then arising orientation of the cable protector 100 in the X-Y-Z coordinate space.

As shown in FIGS. 2A-2B and for at least one implementation, a sleeve center segment 104 may include a sleeve center segment external surface 200, having a first diameter (D1), and a sleeve center segment internal surface 202 having a second diameter (D2), where D1>D2. For at least one implementation, D1=72 mm and D2=61 mm. Other diameters may be used for D1 and D2 in other implementations. For at least one implementation, the sleeve center segment 104 may be configured from an Acrylonitrile Styrene Acrylate (ASA) resin. Other materials may be used for other implementations. The sleeve center segment 104 may include a plurality of drain holes 228, each having a drain hole diameter ($D_H$). Any quantity and arrangement of drain holes 228 may be used for a given implementation of the present disclosure. For at least one implementation, drain holes 228 may be located along a sleeve so as to direct water from a cable in one or more directions, such as away from another cable, away from a structure, or otherwise. For at least one implementation, $D_H$=2.5 mm. Other diameters may be used for other implementations for the drain hole diameter $D_H$. For at least one implementation, one or more of the drain holes may be configured to include a drain hole offset pattern 230. For at least one implementation, the drain hole offset pattern 230 may be configured as a 9.5 mm longitudinal by 8.25 mm circular arc. Other dimensions may be used for other implementations for the drain hole offset pattern 230.

For at least one implementation, the sleeve center segment 104 may include on the sleeve center segment internal surface 202 one or more alignment features including one or more pins 218 and holes 220, a top seating plane 236(T) which includes one or more tabs 222 and channels 224 and a bottom seating plane 236(B) which include one or more tabs 222, and ridges 226. For at least one implementation, the pins 218, holes, 220, channels 224 and ridges 226 individually and/or collectively facilitate compression fitting and securing of a first sleeve hemisphere 101(1) with a second sleeve hemisphere 101(2) which may be rotated by 180 degrees for the mirrored implementation or not rotated for the non-mirrored implementation. As shown, four pins 218 and four holes 220 may be provided along the sleeve center segment 104. Any number, including zero, of pins 218 and/or holes 220 may be used. As further shown, channels 224 and opposing ridges 226 may be provided along the length L3 of the sleeve center segment 104. Any number, including zero, of channels 224 and ridges 226 may be provided along the length L3 of the sleeve center segment 104.

Sleeve End Segments 102

The sleeve center segment 104 may be enclosed by two sleeve end segments 102 which may be further identified as a sleeve proximal end segment 102(P) and a sleeve distal end segment 102(D). The sleeve center segment 104 may vary in one or more of size, shape, configuration, materials, and otherwise from a sleeve end segment 102. For the mirrored implementation, the sleeve proximal segment 102 (P) and the sleeve distal end segment 102(D) may have corresponding sizes, shapes, configurations, materials, and otherwise. For the non-mirrored implementation, the sleeve proximal end segment 102(P) may vary in size, shape, configuration, material, or otherwise from the sleeve distal end segment 102(D).

For at least one implementation, a sleeve end segment 102 may have a sleeve end segment external surface 204 having a third diameter (D3) and a sleeve (proximal or distal) end segment internal surface 206 having a fourth diameter (D4), where D3>D4. For at least one implementation, D3=61 mm and D4=53 mm. Other diameters may be used for D3 and D4 in other implementations. For at least one implementation D2<D3≤D1. For at least one implementation D4≤D2.

A sleeve end segment 102 may include a sleeve end segment outer collar 208 and a sleeve end segment inner collar 214. The sleeve end segment outer collar 208 may have a sleeve end segment outer collar external surface 210, having a fifth diameter (D5) (as shown in FIG. 2A), and a sleeve end segment outer collar internal surface 212, having a sixth diameter (D6) (as shown in FIG. 2A). The sleeve end segment inner collar 214 may have a sleeve end segment internal surface 216 having a seventh diameter (D7) (as further shown in FIG. 2B). For at least one implementation, D5=67 mm, D6=50 mm, and D7=50 mm. For at least one implementation, D6=D7 and D5>D6>D4. For at least one implementation, D2<D5≤D1.

For at least one implementation, a sleeve end segment 102 may include on the sleeve end segment internal surface 216 one or more pins 218, holes 220, tabs 222, channels 224, and ridges 226 which individually and/or collectively facilitate compression fitting and securing of a first sleeve hemisphere 101(1) with a second sleeve hemisphere 101(2) which may be rotated by 180 degrees for the mirrored implementation or not rotated for the non-mirrored implementation. As shown, a pin 218 and a slot 220 may be provided one each of the sleeve first end segment 102(1) and the sleeve second end segment 102(2). As further shown, a channel 224 and an opposing ridge 226 may be provided along the respective lengths L2 of the sleeve proximal end segment 102(P) and the sleeve distal end segment 102(D). Any number, including zero, of channels 224 and ridges 226 may be provided along a given length L2 of a sleeve end segment 102.

For at least one implementation, a sleeve end segment 102 may include one or more collar alignment indents 232 and/or collar alignment ridges 234, with two of each being shown for purposes of illustration, in FIGS. 2A and 2B.

Clamps 106

Figure 3:
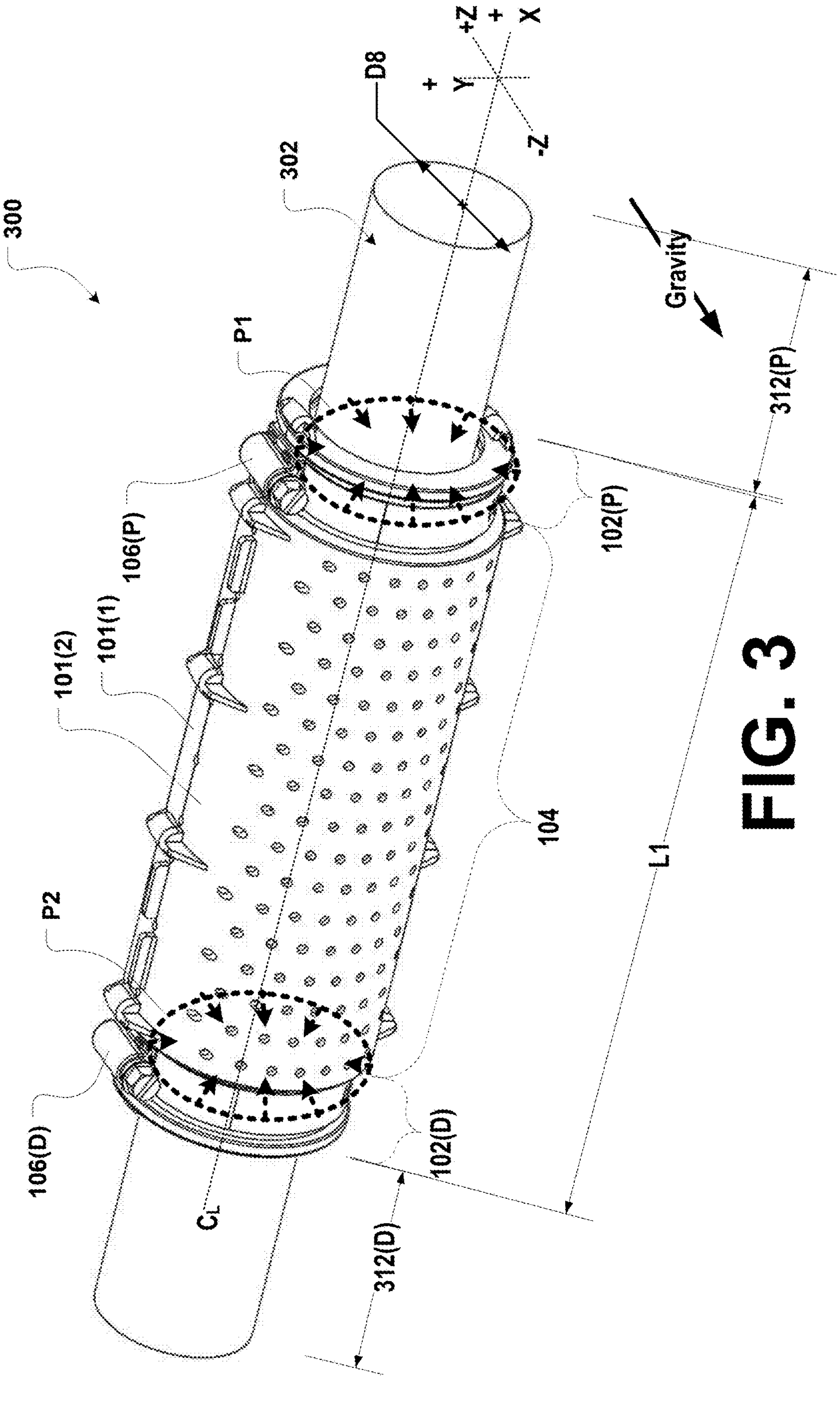
FIG. 3 is a perspective view of the cable protector of FIG. 1, rotated ninety-degrees (90°) about an X-axis of an X-Y-Z coordinate system and enclosing a portion of a cable and in accordance with at least one implementation of the present disclosure.

For at least one implementation, a cable protector 100 may include one or more clamps, such as a proximal clamp 106(P) and a distal clamp 106(D) (as shown in FIG. 1). For purposes of description, the proximal clamp 106(P) may be positioned so as to align with a sleeve proximal end segment 102(P) and the distal clamp 106(D) may be positioned so as to align with a sleeve distal segment 102(D). The proximal clamp 106(P) and distal clamp 106(D), when tightened, secure the first sleeve hemisphere 101(1) to the second sleeve hemisphere 101(2) while the cable protector 100 is assembled for use about a cable 302 (as shown in FIG. 3). For at least one implementation, one of the proximal clamp 106(P) and the distal clamp 106(D) may not be utilized.

One or both of the proximal clamp 106(P) and the distal clamp 106(D) may be configured as a stainless steel or other material, as a cable tie, or the like. For at least one implementation, the proximal clamp 106(P) and the distal clamp 106(D) have a width of thirteen millimeters (13 mm). For other implementations, other widths for one or both of the proximal clamp 106(P) and the distal clamp 106(D) may be used.

Gasket 108

For at least one implementation, a cable protector 100 may include a proximal gasket 108(P) and a distal gasket 108(D). For purposes of description, a proximal gasket 108(P) may be positioned so as to align with a sleeve proximal end segment 102(P) while a distal gasket 108(D) may be positioned so at align with a sleeve distal end segment 102(D) (as further shown in FIG. 4). As shown in FIG. 3 and when the cable protector 100 is assembled about the cable 302, a first sleeve proximal gasket 108(1P) and a second sleeve proximal gasket 108(2P) may be aligned with the proximal clamp 106(1) such that a tightening of the proximal clamp 106(1) exerts a first pressure (P1) on both the first sleeve proximal gasket 108(1P) and the second sleeve proximal gasket 108(2P) and thereby further upon the cable 302. A first sleeve distal gasket 108(1D) and a second sleeve distal gasket 108(2D) may be similarly aligned with the distal clamp 106(D) such that a tightening of the distal clamp 106(D) exerts a second pressure (P2) on the first sleeve distal gasket 108(1D) and on the second sleeve distal gasket 108(2D) and thereby further upon the cable 302. The pressures P1 and P2 may be specified so as to prevent a protected cable assembly 300 from moving laterally (along the X-axis) along a cable 302. For at least one implementation, the pressures P1 and P2 may also inhibit water on a cable exterior proximal portion 312(P) or on a cable exterior distal portion 312(D) from entering into a cable center section 308, a first sleeve center segment 104(1), and a second sleeve center segment 104(2). For at least one implementation, the first pressure P1 and the second pressure P2 may be uniformly, directionally, or otherwise applied to cable 302. For at least one implementation, P1~P2=1-40 PSI (pounds per square inch).

For at least one implementation, only one combination of the first sleeve proximal gasket 108(1P) with the second sleeve proximal gasket 108(2P) or the first sleeve distal gasket 108(1D) with the second sleeve distal gasket 108(2D) may be utilized.

For at least one implementation, a gasket 108 may have a width of thirteen millimeters (13 mm). For other implementations, other widths may be used for other implementations. For at least one implementation, a gasket 108 may have a gasket thickness (GT) of eight millimeters (8 mm). For other implementations, other thicknesses may be used. For at least one implementation, a gasket 108 may be configured from a material having a low density, good flexibility, high tensile strength, high resistance against heat and chemicals, including water, and the like with one non-limiting being a form of a synthetic rubber such as, but not limited to, an Ethylene Propylene Diene Monomer (EPDM) rubber, or the like. Gaskets formed from other materials may be used in other implementations, including gaskets formed from silicone, rubber, and other materials.

For at least one implementation, a gasket 108 may have an adhesive back with the adhesive being selected to permanently, temporarily, or otherwise adhere a gasket 108 to one of a collar 110 (when used) or a sleeve (proximal or distal) end segment internal surface 206. For at least one implementation, the adhesive may have one or more of a tensile adhesion strength and/or a shear adhesion strength sufficient to retain a gasket within a collar 110 or on a sleeve end segment internal surface 206. Other tensile adhesion strengths and/or shear adhesion strengths may be used for other implementations. For at least one implementation, a gasket 108 may not have an adhesive back and may be configured for setting within a collar 110 and/or a cavity formed by a sleeve (proximal or distal) end segment internal surface 206 and the opposing raised sides of a sleeve end segment outer collar 208 and a sleeve end segment inner collar 214. For at least one implementation a sleeve (proximal or distal) end segment 102 includes a sleeve end segment outer collar 208 and a sleeve end segment inner collar 214.

Collar 110

For at least one implementation, a cable protector 100 may include a proximal collar 110(P) and/or a distal collar 110(D). For at least one implementation, only a proximal collar 110(P) may be utilized. For at least one implementation, the first sleeve proximal collar 110(1P) may be positioned proximal to and/or corresponding with the first sleeve proximal end segment 102(1P) and the first sleeve proximal gasket 108(1P), while the first sleeve distal collar 110(1D) may be positioned proximal to and/or corresponding with the first sleeve distal end segment 102(1D) and the first sleeve distal gasket 108(1D). A corresponding configuration may be utilized for the second sleeve hemisphere 101(2).

For at least one implementation, a collar 110 may be configured to receive a gasket 108. The collar 110 may be configured to be adaptable, with a gasket 108 inserted therein, for securing a cable protector 100 about varying widths of cable 302 and without having to change a size and/or dimensions in a sleeve hemisphere 101. As shown in FIG. 3, a cable exterior portion 312 may have a cable diameter, herein an eighth diameter (D8). For at least one implementation, 34 mm<D8<45 mm.

For at least one implementation, a collar 110 may have an interior collar diameter (DCI) and an exterior collar diameter (DCE). For at least one implementation, DCI=44 mm and DCE=47 mm. For another implementation, DCI=47 mm and DCE=53 mm. Other dimensions of the DCI and the DCE may be used in other implementation of the present disclosure.

For at least one implementation, the collar diameter DC may be determined based on a ratio of a gasket thickness plus a cable thickness to achieve a given first pressure P1 or second pressure P2 upon a cable 302 by a cable protector 100 (as shown by a protected cable 302), where:

$$DC = D8 + (GT \times R)$$

where R is compression percentage to be applied to a gasket 108, upon tightening of a clamp 106, such that a first pressure P1 or a second pressure P2 (as applicable) is applied by the gasket 108 upon a cable 302 proceeding trough an assemble cable protector 100. For a non-limiting example, a gasket 108 having a gasket thickness (GT) of 8 mm may be compressed 60% upon a tightening of a clamp 106 so that a first pressure P1 of 1-40 PSI is applied on the cable 302 by the as assembled protected cable assembly 300. Other thicknesses for the collar diameter DC may be used in other implementations, as may be determined by experimentation, trial and error, field observations, mathematically, or otherwise.

Figure 4:
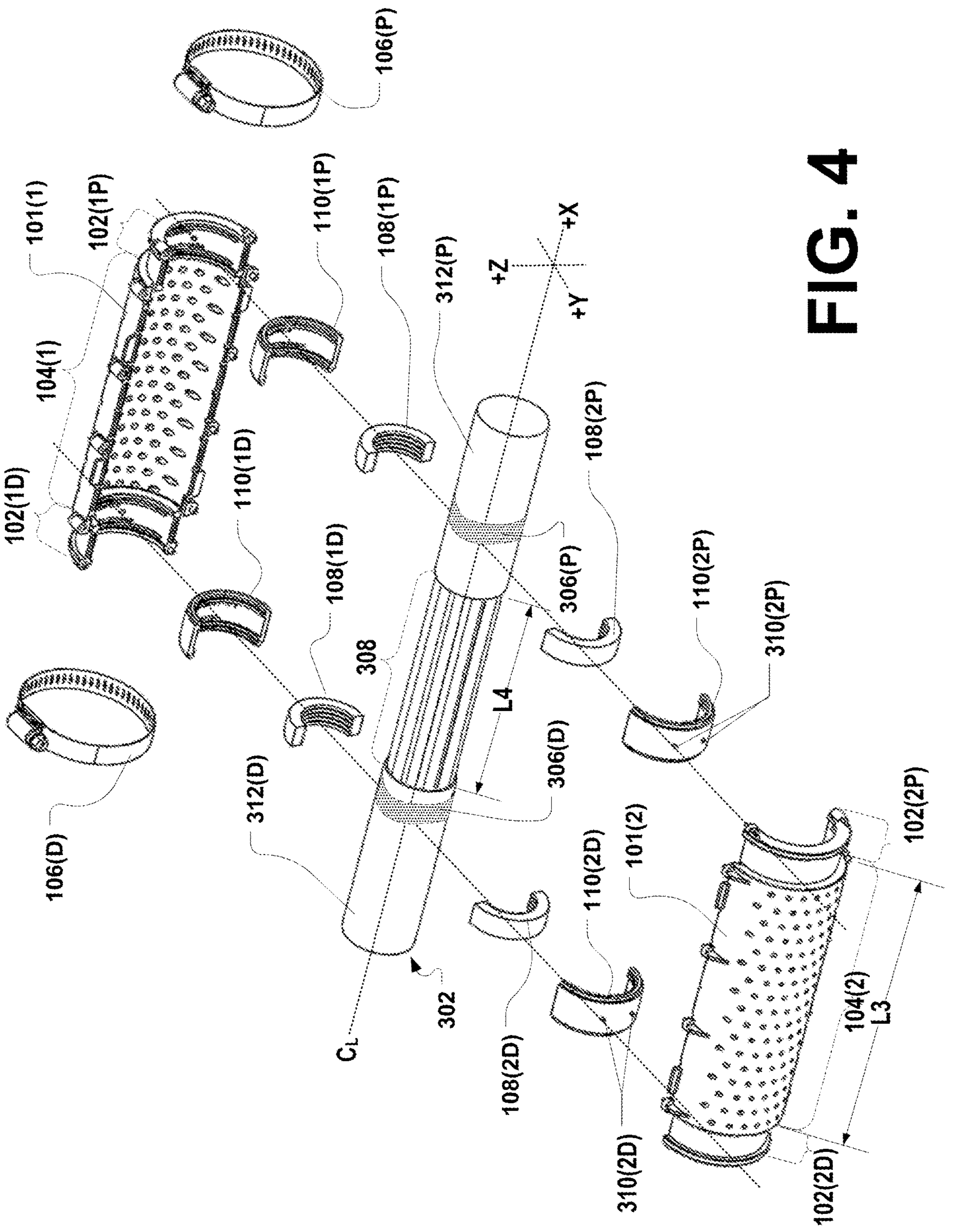
FIG. 4 is an exploded view of the cable protector enclosing the cable of FIG. 3 and in accordance with at least one implementation of the present disclosure

As shown in FIG. 4, a collar 110 may include one or more collar pins 310, such as the as shown second sleeve proximal collar pins 310(2P) and the second sleeve distal collar pins 310(2D). The collar pins 310 may be configured to correspond to one or more collar alignment indents 232 provided by a sleeve end segment 102 (as shown in FIGS. 2A and 2B). For at least one implementation, a collar 110 may include one or more collar alignment ridges (not shown) which may correspond for mating with one or more collar alignment ridges 234 provided by a sleeve end segment 102 (as shown in FIGS. 2A and 2B).

As further shown in FIG. 4, a cable 302 may have a cable center section 308, a cable proximal portion 306(P), a cable distal portion 306(D), a cable external proximal portion 312(P), and a cable external distal portion 312(D), where the cable proximal portion 306(P) and the cable distal portion 306(D) represent areas of the cable 302 that are surrounded by the gaskets 108 when the cable protector 100 is utilized. For at least one implementation, an outer layer or jacket for the cable 302 may be removed when the cable 302 is to be used with a cable protector 100. Removal of the outer layer along the cable center section 308 may facilitate drainage of water from within the cable 302 to an environment external to the cable protector 100 and thereby preventing and/or minimizing an intrusion of water into a Ground Level Equipment Cabinet (GLEC) 502 (as shown, for example, in FIG. 5). For at least one implementation, the cable center section 308 (from which the outer layer is removed) may have a length of L4. For at least one implementation, L4=127 mm. For at least one implementation, L4≤L3.

As shown in FIG. 5, an implementation of the present disclosure may include a cable protector 100 being assembled about a cable 302 connecting a GLEC 502 to a tower 506. The GLEC 502 may be situated on a ground level 500, such as the Earth surface, a building surface or otherwise. The cable 302 may be coupled to the GLEC 502 at GLEC port 504. Various devices and approaches for coupling a cable 302 to a GLEC 502 via a GLEC port 504 are known in the art and any which may include any known or later arising components and/or methodologies may be used with an implementation of the present disclosure. The tower 506 may be similarly or otherwise situated relative to the ground level. The cable 302 may be further coupled to an outdoor rated component (ORC) 508 provided on, by, at, or near the tower 506.

When the cable protector 100 is secured about a portion of the cable 302, the cable protector 100 expels water, in the form of one or more water drops 512 (which may include a stream or flow of water) that would otherwise proceed along an exterior surface of the cable 302 and/or within the cable 302 into the GLEC 502 to the ground level 500 or other external environment, which may include (for one or more implementations) a drain 514.

Figure 6:
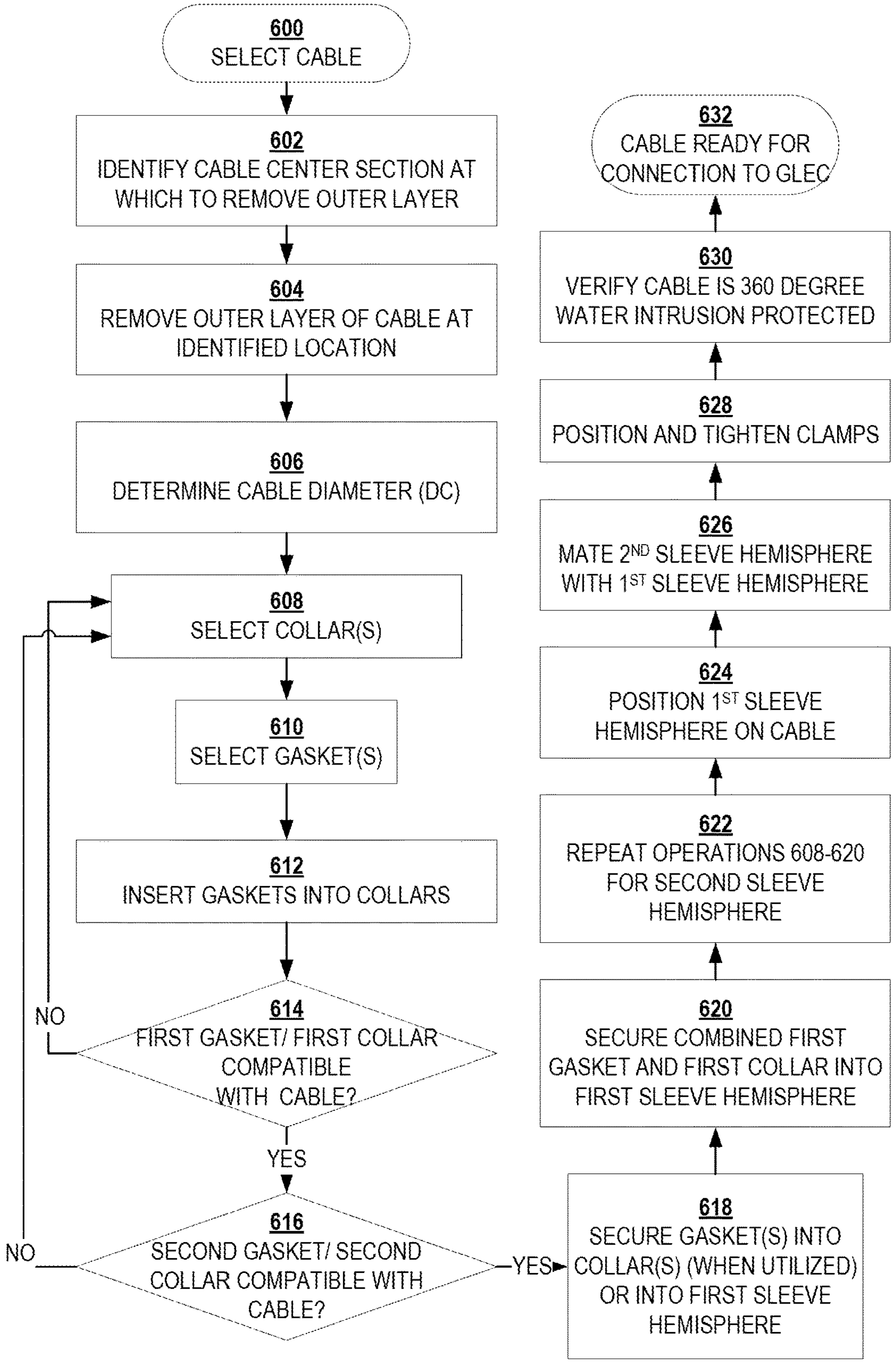
FIG. 6 is a flow chart illustrating a process for isolating an unprotected component from water via cable penetrations and in accordance with at least one implementation of the present disclosure.

As shown in FIG. 6 and for at least one implementation, a process is provided for isolating an unprotected component, such as a GLEC 502, from water penetrations via a cable 302. The process may begin, per Operation 600 with selecting a cable 302 that is exposed to an "wet" environment (i.e., one that is either outdoors or otherwise passes by and/or through an area where water exists at a given time such as in a pool, car wash, or otherwise) and is to be protected.

As per Operation 602, the process may include identifying a cable center section 308 from which an outer layer of the cable 302 is to be removed. For at least one implementation, the cable center section 308 may be identified based on a low point, in a span of the cable 302, between a connection to a GLEC 502 and a connection to a tower 506 or other structure. For another implementation, the cable center section 308 may be selected based on a proximity of the location on the cable to a GLEC port 504.

As per Operation 604, the process may include removing a portion of an outer layer, or jacket, of the cable 302 at the identified cable center section 308. For implementations where intra-cable water propagation into a GLEC is not a concern, Operation 604 may not be implemented.

As per Operation 606, the process may include determining a diameter of the cable 302.

As per Operation 608, the process may include selecting one or more of: a first sleeve proximal collar 110(1P) for holding a first sleeve proximal gasket 108(1P); a first sleeve distal collar 110(1D) for holding a first sleeve distal gasket 108(1D); a second sleeve proximal collar 110(2P) for holding a second sleeve proximal gasket 108(2P); and a second sleeve distal collar 110(2D) for holding a second sleeve distal gasket 108(2D). For at least one implementation, the first sleeve proximal collar 110(1P) and the second sleeve proximal collar 110(2P) are the same. For another implementation, the first sleeve distal collar 110(1D) and the second sleeve distal collar 110(2D) are the same. For another implementation, different sizes may be used for the proximal collars 110(P) and for the distal collars 110(D). For an implementation, the proximal collars 110(P) may be utilized while the distal collars 110(D) are not utilized.

As per Operation 610, the process may include selecting one or more of a first sleeve proximal gasket 108(1P), a first sleeve distal gasket 108(1D), a second sleeve proximal gasket 108(2P) and a second sleeve distal gasket 108(2D). It is to be appreciated that for implementations where intra-cable water propagation into a GLEC 502 is not a concern, the first sleeve distal gasket 108(1D) and the second sleeve distal gasket 108(2D) may not be needed.

As per Operation 612, the process may include temporarily inserting a first sleeve proximal gasket 108(1P) into a first sleeve proximal collar 110(1P) and inserting a second sleeve proximal gasket 108(2P) into a second sleeve proximal collar 110(2P). This Operation may be repeated for the distal gaskets and distal collars (when utilized).

As per Operation 614, the process may include verifying that the, as temporarily inserted, the gasket 108 and collar 110 combination has a diameter that is compatible with the cable diameter (DC). If "NO", the process may return to Operation 608 and the selection of another gasket 108 and/or collar 110. If "YES", the process proceeds to Operation 616.

As per Operation 616, the process may include verifying that a, as temporarily inserted, given distal gasket 108(D) and distal collar 110(D) combination has a diameter that is compatible with the cable diameter (DC). If "NO", the process may return to Operation 608, with respect to the distal gasket 108(D) and/or distal collar 110(D) and the selection of another distal gasket 108(D) and/or another distal collar 110(D). If "YES", the process proceeds to Operation 618. It is to be appreciated that Operation 616 may not be implemented when a distal gasket 108(D) is not utilized and/or when the distal gaskets 108(D) and distal collars 110(D) are identical to the proximal gaskets 108(P) and the proximal collars 110(P) selected per Operation 610.

As per Operation 618, the process may include securing the respective gaskets 108 into the collars 110 (when a collar 110 is to be utilized) or into the first sleeve hemisphere 101(1)(when a collar 110 is not to be utilized with a given gasket 108). The securing of the gaskets 108 into the collars 110 or into a sleeve hemisphere 101 may utilize peel and press adhesives, screws, pins and holes, channels and ridges, compression, and/or any other known or later arising approaches for securing a gasket into another component.

As per Operation 620, the process may include securing a gasket 108 and collar 110 combination into a given sleeve hemisphere 101. The securing of the combined gasket 108 and collar 110 into a given sleeve hemisphere 101 may utilize peel and press adhesives, screws, pins and holes, channels and ridges, compression, and/or any other known or later arising approaches for securing a first component into a second component.

As per Operation 622, the process may include repeating Operations 608-620 with respect to the second sleeve hemisphere 101(2).

As per Operation 624, the process may include positioning the first sleeve hemisphere 101(1) on the cable 302. The positioning may include aligning the first sleeve hemisphere 101(1) relative to the cable 302 such that the first sleeve segment inner collar 214 on the first sleeve proximal end segment 102(1P) and first sleeve distal end segment 102(1D) respectively embrace a portion of the cable proximal portion 306(P) and a portion of the cable distal portion 306(D). For at least one implementation, such portions of the cable exterior include a one hundred and eighty degree (180°) portion of the cable 302 such that a given gasket 108 surrounds one hundred and eighty degrees (180°) of the corresponding cable exterior portion 306.

As per Operation 626, the process may include mating the second sleeve hemisphere 101(2) with the first sleeve hemisphere 101(1) such that the as mated sleeve hemispheres 101 surround the cable 302.

As per Operation 628, the process may include positioning and tightening each of the proximal clamp 106(P) and the distal clamp 106(D). With the tightening of the clamps 106, the first pressure P1 and the second pressure P2 are respectively applied on the cable 302 thereby sealing the cable first and second exterior portions from water intrusions along the exterior of the cable 302 into the cable center section 308.

As per Operation 630, the process may include verifying the cable 302 is three-hundred and sixty degrees (360°) water intrusion protected. If "YES", the process proceeds to Operation 632. If "NO", the process may continue with repeating Operation 628 and further tightening the clamps or, if after further tightening the cable 302 remains not water intrusion protected, returning to one of Operation 608, and the selection of different gaskets, and/or Operation 610 and the selection of different collars and repeating, with the new gasket(s) 108 and/or collar(s) 110, Operations 614-630.

As per Operation 632, the cable protector 100 is now installed about the cable 302 and thereby forms a protected cable assembly 300 which is determined to be suitable and ready for connection to a GLEC 502 and the process ends.

The various operations shown in FIG. 6 are described herein with respect to at least one implementation of the present disclosure. The described operations may arise in the sequence described, or otherwise and the various implementations of the present disclosure are not intended to be limited to any given set or sequence of operations. Variations in the operations used and sequencing thereof may arise and are intended to be within the scope of the present disclosure.

Although various implementations of the present disclosure have been described above with a certain degree of particularity, or with reference to one or more individual implementations, those skilled in the art could make numerous alterations to the disclosed implementations without departing from the spirit or scope of the claimed invention. The use of the terms "approximately" or "substantially" means that a value of an element has a parameter that is expected to be close to a stated value or position. As is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom", "left" and "right", "up" or "down", "first", "second", "next", "last", "before", "after", and other similar terms are used for description and ease of reference purposes and are not intended to be limiting to any orientation or configuration of any elements or sequences of operations for the various implementations of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an implementation of the present disclosure. Other implementations are therefore contemplated. It is intended that matter contained in the above description and shown in the accompanying drawings shall be interpreted as illustrative of implementations and not limiting. Changes in detail or structure may be made without departing from the basic elements of the invention as defined in the following claims.

What is claimed is:

1. An assembly comprising:

a first sleeve hemisphere;

wherein the first sleeve hemisphere includes at least one drain hole;

a first sleeve proximal gasket positioned within the first sleeve hemisphere;

a second sleeve hemisphere which mates with the first sleeve hemisphere to form a full sleeve; and a second sleeve proximal gasket positioned within the second sleeve hemisphere; and wherein, when a cable protector is formed by the mating of the first sleeve hemisphere with the second sleeve hemisphere and around at least a cable center section of a cable;

wherein the cable center section is coupled to a cable proximal portion which is further coupled to a cable external proximal portion; and wherein, when the cable protector is formed, the first sleeve proximal gasket combined with the second sleeve proximal gasket contact and surround the cable proximal portion and inhibit a proximal water inflow from the cable external proximal portion into the cable center section, and the at least one drain hole facilitates water outflow from the cable center section to an external environment.

2. The assembly of claim 1, wherein, when the cable protector is formed:

the first sleeve proximal gasket combined with the second sleeve proximal gasket inhibit a proximal water outflow from the cable center section onto the cable external proximal portion.

3. The assembly of claim 2, wherein gravitational forces further facilitate the water outflow from the cable center section to the external environment via the at least one drain hole.

4. The assembly of claim 1, wherein the first sleeve hemisphere and the second sleeve hemisphere have identical configurations;

wherein, when the cable protector is formed, the cable protector is oriented within an X-Y-Z coordinate system;

wherein an X-axis of the X-Y-Z coordinate system corresponds to a center line of the cable protector;

wherein a Y-axis of the X-Y-Z coordinate system is a pitch axis; and wherein, the second sleeve hemisphere is rotated one-hundred and eighty degrees (180°) about the pitch axis to mate with the first sleeve hemisphere and form the cable protector.

5. The assembly of claim 1, wherein the cable has a cable diameter and a length that extends throughout and beyond a length of the cable protector; and wherein the assembly further comprises:

a first sleeve proximal collar; and a second sleeve proximal collar;

wherein the first sleeve proximal collar and the second sleeve proximal collar adapt the cable protector, when formed, for use with a second cable having a second cable diameter and without changing dimensions for at least one combination of:

the first sleeve hemisphere with the second sleeve hemisphere; and the first sleeve proximal gasket with the second sleeve proximal gasket.

6. The assembly of claim 5, further comprising:

a proximal clamp;

wherein the proximal clamp surrounds a proximal portion of the full sleeve;

wherein upon tightening of the proximal clamp, a first pressure ("P1") is uniformly applied, by the proximal clamp, onto the cable proximal portion via a first combination of the first sleeve hemisphere, the first sleeve proximal collar and the first sleeve proximal gasket, and a second combination of the second sleeve hemisphere, the second sleeve proximal collar, and the second sleeve proximal gasket; and wherein P1 further inhibits the proximal water inflow from a cable exterior proximal portion into the cable center section.

7. The assembly of claim 6, wherein the cable center section is further coupled to a cable distal portion which is further coupled to a cable external distal portion;

wherein the assembly further comprise:

a first sleeve distal gasket positioned within the first sleeve hemisphere; and a second sleeve distal gasket positioned within the second sleeve hemisphere; and wherein, when the cable protector is formed, the first sleeve distal gasket combined with the second sleeve distal gasket contact and surround the cable distal portion and inhibit a distal water inflow from the cable external distal portion into the cable center section.

8. The assembly of claim 7, further comprising:

a first sleeve distal collar; and a second sleeve distal collar; and wherein the first sleeve distal collar and the second sleeve distal collar adapt the cable protector for use with a second cable having a second cable diameter and without changing dimensions for at least one combination of:

the first sleeve hemisphere with the second sleeve hemisphere; and the first sleeve distal gasket with the second sleeve distal gasket.

9. The assembly of claim 8, further comprising:

a distal clamp;

wherein the distal clamp surrounds a distal portion of the full sleeve;

wherein upon tightening of the distal clamp, a second pressure ("P2") is applied by the distal clamp, through the full sleeve and further through the first sleeve distal gasket and the second sleeve distal gasket and onto the cable at a cable exterior distal portion; and wherein P2 further inhibits water flow from with the center segment of the full sleeve onto the cable exterior distal portion.

10. The assembly of claim 1, wherein the cable center section is further coupled to a cable distal portion which is further coupled to a cable external distal portion;

wherein the assembly further comprises:

a first sleeve distal gasket positioned within the first sleeve hemisphere; and a second sleeve distal gasket positioned within the second sleeve hemisphere; and wherein, when the cable protector is formed, the first sleeve distal gasket combined with the second sleeve distal gasket contact and surround the cable distal portion and inhibit a distal water inflow from the cable external distal portion into the cable center section.

11. The assembly of claim 10, further comprising:

a proximal clamp;

wherein the proximal clamp surrounds a proximal portion of the full sleeve;

wherein upon tightening of the proximal clamp, a first pressure ("P1") is uniformly applied, by the proximal clamp, onto the cable proximal portion via a first combination of the first sleeve hemisphere and the first sleeve proximal gasket, and a second combination of the second sleeve hemisphere and the second sleeve proximal gasket; and wherein P1 further inhibits the proximal water inflow from a cable exterior proximal portion into the cable center section; and a distal clamp surrounding a distal portion of the full sleeve;

wherein the distal clamp surrounds a distal portion of the full sleeve;

wherein upon tightening of the distal clamp, a second pressure ("P2") is applied by the second clamp, through the full sleeve and further through the first sleeve distal gasket and the second sleeve distal gasket and onto the cable at a cable exterior distal portion; and wherein P2 further inhibits water flow from with the center segment of the full sleeve onto the cable exterior distal portion.

12. The assembly of claim 1, wherein the first sleeve hemisphere further comprises, in a linear sequence:

a first sleeve distal end segment;

a first sleeve center segment; and a first sleeve proximal end segment comprising:

a first sleeve proximal end segment outer collar; and a first sleeve proximal end segment inner collar;

wherein the first sleeve proximal gasket is further positioned within the first sleeve proximal end segment between the first sleeve proximal end segment outer collar and the first sleeve proximal end segment inner collar.

13. The assembly of claim 6, wherein the first sleeve hemisphere further comprises, in a linear sequence:

a first sleeve distal end segment comprising:

a first sleeve distal end segment outer collar; and a first sleeve distal end segment inner collar;

a first sleeve center segment; and a first sleeve proximal end segment comprising:

a first sleeve proximal end segment outer collar; and a first sleeve proximal end segment inner collar;

wherein the first sleeve proximal gasket is further positioned within a first cavity in the first sleeve proximal end segment formed between the first sleeve proximal end segment outer collar and the first sleeve proximal end segment inner collar; and wherein a first sleeve distal gasket is further positioned within the first sleeve distal end segment in a second cavity formed between the first sleeve distal end segment outer collar and the first sleeve distal end segment inner collar.

14. The assembly of claim 13, wherein the first cavity forms a proximal hemisphere having a fourth diameter; and wherein the second cavity forms a distal hemisphere having the fourth diameter.

15. The assembly of claim 1, wherein the first sleeve hemisphere further comprises:

a plurality of first channels spaced along an upper portion of the first sleeve hemisphere; and a plurality of first ridges spaced along a lower portion of the first sleeve hemisphere;

wherein the second sleeve hemisphere is a mirrored configuration of the first sleeve hemisphere and further comprises:

a plurality of second channels spaced along a lower portion of the second sleeve hemisphere; and a plurality of second ridges spaced along an upper portion of the first sleeve hemisphere; and and wherein the mating of the first sleeve hemisphere with the second sleeve hemisphere includes the insertion of the plurality of first ridges into the plurality of second channels and the insertion of the plurality of second ridges into the plurality of first channels.

16. The assembly of claim 1, wherein, when the cable protector is formed, the cable protector is oriented within an X-Y-Z coordinate system;

wherein an X-axis of the X-Y-Z coordinate system corresponds to a center line of the cable protector;

wherein a Y-axis of the X-Y-Z coordinate system is a pitch axis;

wherein the first sleeve hemisphere further comprises in an increasing sequence along the X-axis:

a first sleeve distal end segment;

a first sleeve center segment; and a first sleeve proximal end segment;

wherein the first sleeve hemisphere and the second sleeve hemisphere have identical configurations;

wherein, the second sleeve hemisphere is rotated one-hundred and eighty degrees (180°) about the pitch axis and into a mirrored configuration to facilitate mating of the second sleeve hemisphere with the first sleeve hemisphere and to form the cable protector;

wherein the first sleeve proximal gasket is further positioned within the first sleeve proximal end segment;

wherein the second sleeve hemisphere, when rotated, further comprises in the increasing sequence along the X-axis:

a second sleeve distal end segment;

a second sleeve center segment; and a second sleeve proximal end segment; and wherein the second sleeve proximal gasket is further positioned within the second sleeve proximal end segment.

17. An assembly comprising:

a first sleeve hemisphere, further comprising:

a plurality of first pins spaced along an upper portion of the first sleeve hemisphere; and a plurality of first holes spaced along a lower portion of the first sleeve hemisphere;

a first sleeve proximal gasket positioned within the first sleeve hemisphere;

a second sleeve hemisphere having a mirrored configuration of the first sleeve hemisphere, which mates with the first sleeve hemisphere to form a full sleeve, and further comprises:

a plurality of second pins spaced along a lower portion of the second sleeve hemisphere; and a plurality of second holes spaced along an upper portion of the first sleeve hemisphere; and a second sleeve proximal gasket positioned within the second sleeve hemisphere; and wherein, when a cable protector is formed by the mating of the first sleeve hemisphere with the second sleeve hemisphere and around at least a cable center section of a cable;

wherein the cable center section is coupled to a cable proximal portion which is further coupled to a cable external proximal portion; and wherein, when the cable protector is formed, the first sleeve proximal gasket combined with the second sleeve proximal gasket contact and surround the cable proximal portion and inhibit a proximal water inflow from the cable external proximal portion into the cable center section; and wherein the mating of the first sleeve hemisphere with the second sleeve hemisphere includes insertion of the plurality of first pins into the plurality of second holes and insertion of the plurality of second pins into the plurality of first holes.

18. A process, for protecting a ground level equipment cabinet from water intrusion via a cable coupled thereto, comprising:

selecting a cable coupled to a ground level equipment cabinet ("GLEC");

identifying a cable center section, of the cable, at which to remove an outer layer of the cable;

removing the outer layer of the cable along the cable center section;

determining a cable diameter for the cable;

for each of a first sleeve hemisphere and a second sleeve hemisphere, operations including:

first selecting, a proximal collar;

second selecting a proximal gasket based on the proximal collar and the cable diameter;

first inserting the proximal gasket into the proximal collar;

first determining if the proximal gasket and the proximal collar are compatible with the cable;

when compatible, first securing the proximal gasket into the proximal collar to form a first combined proximal gasket and proximal collar combination;

if not compatible, third selecting at least one of a second proximal gasket and a second proximal collar until a second proximal gasket and proximal collar combination are compatible with the cable;

second securing one of the first proximal gasket and proximal collar combination and the second proximal gasket and proximal collar combination into the first sleeve hemisphere;

repeating the operations above for the second sleeve hemisphere;

repeating the operations above for a second distal gasket and a second distal collar combination;

positioning the first sleeve hemisphere on the cable;

mating the second sleeve hemisphere to the first sleeve hemisphere to form a full sleeve;

positioning and tightening a proximal clamp around a proximal end of the full sleeve; and positioning and tightening a distal clamp around a proximal end of the full sleeve;

wherein upon the tightening of the proximal clamp and the distal clamp inflows of water into the cable are inhibited and outflows of water from the cable are facilitated to form a substantially three-hundred and sixty degree ("360°") water protected cable.

19. The process of claim 18, further comprising:

coupling the 360° water protected cable to the GLEC.

* * * * *